United States Patent
Sasaki et al.

(10) Patent No.: US 8,013,560 B2
(45) Date of Patent: Sep. 6, 2011

(54) METHOD FOR COMPENSATING FOR ANGULAR TRANSMISSION ERROR OF AN ACTUATOR

(75) Inventors: Kozo Sasaki, Azumino (JP); Yoshifumi Okitsu, Azumino (JP); Toshio Yajima, Azumino (JP); Makoto Iwasaki, Nagoya (JP)

(73) Assignee: Harmonic Drive Systems Inc., Tokyo (JP)

( * ) Notice: Subject to any disclaimer, the term of this patent is extended or adjusted under 35 U.S.C. 154(b) by 338 days.

(21) Appl. No.: 12/353,115

(22) Filed: Jan. 13, 2009

(65) Prior Publication Data

US 2009/0200979 A1  Aug. 13, 2009

(30) Foreign Application Priority Data

Feb. 7, 2008  (JP) .................... 2008-028195

(51) Int. Cl.
*G05B 11/01* (2006.01)
(52) U.S. Cl. ........ 318/632; 318/633; 318/634; 318/635; 318/636; 318/637; 318/638; 318/639; 318/560
(58) Field of Classification Search .................. 318/632, 318/633–639, 560
See application file for complete search history.

(56) References Cited

U.S. PATENT DOCUMENTS

| 6,505,703 B2 * | 1/2003 | Stout et al. ................. 180/446 |
| 6,901,320 B2 * | 5/2005 | Yao et al. ........................ 701/44 |

FOREIGN PATENT DOCUMENTS

| JP | 2002-175120 A | 6/2002 |
| JP | 2002-244740 A | 8/2002 |
| JP | 2006-039958 A | 2/2006 |

* cited by examiner

*Primary Examiner* — Walter Benson
*Assistant Examiner* — David S Luo
(74) *Attorney, Agent, or Firm* — Buchanan Ingersoll & Rooney PC

(57) ABSTRACT

The non-linear elastic deformation component included in the angular transmission error of an actuator provided with a wave gear drive is a component of the angular transmission error occurring due to elastic deformation of a flexible externally-toothed gear when the direction of rotation of the motor shaft changes. This component can be analyzed by driving the motor in a sine-wave shape. A model of the non-linear elastic deformation component (non-linear model) obtained from the analysis results is used to store data or a function for compensating for this component in a motor-control device. Compensation for the non-linear elastic deformation component ($\theta_{Hys}$) is added to a motor-shaft angle command ($\theta^*_M$) as a compensation input ($N\theta^*_{TE}$) for feed-forward compensation. As a result, the non-linear elastic deformation component ($\theta_{Hys}$) can be effectively reduced, and the positioning precision of the actuator can be improved.

2 Claims, 11 Drawing Sheets

BLOCK DIAGRAM OF COMPENSATION FOR ANGULAR TRANSMISSION ERROR

MODEL OF NON-LINEAR ELASTIC DEFORMATION COMPONENT

FIG.7 ANGULAR TRANSMISSION ERROR (HYSTERESIS CHARACTERISTICS)

FIG.8 BLOCK DIAGRAM OF COMPENSATION FOR ANGULAR TRANSMISSION ERROR

METHOD FOR COMPENSATING FOR ANGULAR TRANSMISSION ERROR OF AN ACTUATOR

BACKGROUND OF THE INVENTION

1. Field of the Invention

The present invention relates to an actuator configured so that output rotation of a motor is reduced in speed and output via a wave gear drive. The present invention more specifically relates to a method for compensating for angular transmission error of an actuator, the method being capable of eliminating or reducing an angular transmission error component (a non-linear elastic deformation component) resulting from elastic deformation of a flexible externally-toothed gear of the wave gear drive.

2. Description of the Related Art (Current State of Angular Transmission Error Compensation for an Actuator Provided with a Wave Gear Drive)

Angular transmission error degrades the positioning response of an actuator provided with a wave gear drive. The components of this angular transmission error in the prior art are a motor-shaft synchronized component (fixed component), which is synchronized to the rotation of a motor shaft (input shaft); an FS-WG relative-rotation synchronized component (mobile component) arising from relative rotation between a flexible externally-toothed gear (FS—[flex spline]) and a wave generator (WG); and a load-shaft synchronized component, which is synchronized to the rotation of the actuator output shaft. Among these components, compensation for the motor-shaft synchronized component has been actively performed.

In JP-A 2002-175120, angular transmission error data of an actuator output shaft is measured relative to the rotational positions of one revolution of a motor rotating shaft for an actuator provided with a wave gear drive. Positional feedback control is performed on the actuator output shaft on the basis of these measurements. Feedback control for positioning an actuator output shaft is similarly proposed in JP-A 2002-244740. In JP-A 2006-039958, a dividing system for performing an index-table dividing operation using an actuator provided with a wave gear drive is proposed. In this dividing system, driving control for an actuator and the index-table dividing operation are performed according to a set dividing-operation pattern. The stored operation pattern can circumvent or minimize oscillations occurring during acceleration and deceleration of the actuator as a result of the elasticity of the flexible externally-toothed gear, and positioning can be performed in a short period of time.

The angular transmission error of an actuator provided with a wave gear drive includes a non-linear elastic deformation component that is not synchronized to rotation and that occurs due to elastic deformation of the flexible externally-toothed gear of the wave gear drive. The proportions of the motor-shaft synchronized component (fixed component) and the non-linear elastic deformation component in the angular transmission error are large when overshoot occurs in an actuator provided with a wave gear drive, as shown in Table 1. The non-linear elastic deformation component must therefore be removed or reduced in order to improve the positioning precision of the actuator output shaft as shown in the column "Goal" in Table 1.

TABLE 1

Proportions of angular transmission error during incidence of overshoot

|  |  | No compensation | Current state | Goal |
|---|---|---|---|---|
| Compensation possible | Non-linear elastic deformation component | 43% | 43% | 0% |
|  | Motor-shaft synchronized component (fixed component) | 41% | 5% | 5% |
| Compensation not possible | FS-WG relative-rotation synchronized component (mobile component) | 11% | 11% | 11% |
|  | Load-shaft synchronized component | 5% | 5% | 5% |
|  | Total | 100% | 64% | 21% |

In the prior art, an amount of correction corresponding to the component synchronized to the motor shaft was added to the positioning command or positioning feedback as proposed in JP-A 2002-175120 and JP-A 2002-244740, whereby the motor-shaft synchronized component (fixed component) was reduced or eliminated, and positioning precision was improved. However, an effective method was not proposed for compensating for the non-linear elastic deformation component that is not synchronized to rotation and that occurs due to elastic deformation of the flexible externally-toothed gear. The only such method is the method for performing operational control proposed in JP-A 2006-039958, in which the elasticity of the flexible externally-toothed gear is considered beforehand in the standard operational pattern.

Measurement results for the FS-WG relative-rotation synchronized component (mobile component) have poor reproducibility. The amplitude of the load-shaft synchronized component changes depending on the assembly state of the load, and means for measuring the absolute angle of the load shaft do not exist. Therefore, compensation cannot be performed for the FS-WG relative-rotation synchronized component (mobile component) and the load-shaft synchronized component.

Compensation for the non-linear elastic deformation component along with the motor-shaft synchronized component must therefore be performed in order to increase the positioning precision of an actuator provided with a wave gear drive.

SUMMARY OF THE INVENTION

In light of these problems, it is an object of the present invention to propose a method for compensating for angular transmission error of an actuator, the method being capable of effectively eliminating or minimizing the non-linear elastic deformation component included in the angular transmission error of an actuator provided with a wave gear drive.

It is also an object of the present invention to add compensation for the non-linear elastic deformation component to current angular transmission error compensation, thereby providing a method for compensating for angular transmission error of an actuator capable of further improving positioning precision.

The non-linear elastic deformation component included in the angular transmission error of an actuator provided with a wave gear drive is a component of the angular transmission error occurring due to elastic deformation of the flexible externally-toothed gear when the direction of rotation of the motor changes, and can be analyzed by driving the motor in a sine-wave shape manner. A model of the non-linear elastic deformation component (non-linear model) obtained from the analysis results is used in the present invention to store data or a function for compensating for this component in a motor-control device. Compensation for the non-linear elastic deformation component ($\theta_{Hys}$) is added to a motor-shaft angle command ($\theta^*_M$) as a compensation input ($N\theta^*_{TE}$) for feed-forward compensation. As a result, according to the present invention, the non-linear elastic deformation component ($\theta_{Hys}$) can be effectively reduced, and the positioning precision of the actuator can be improved.

In other words, in the present invention, there is provided a method for compensating for angular transmission error of an actuator provided with a motor and a wave gear drive, comprising using a non-linear model composed of a mathematical model given by equations (1) through (3) to stipulate dynamic characteristics of a non-linear elastic deformation component included in the angular transmission error of the actuator and brought about by elastic deformation of a flexible externally-toothed gear of the wave gear drive:

$$\theta_{Hys}(\delta) = \begin{cases} \mathrm{sgn}(\omega_M)(2\theta_{def}\,g(\xi) - \theta'_{Hys}) \\ \quad :|\delta| < \theta_r \text{ and } |\theta_{Hys}| < \theta_{def} \\ \mathrm{sgn}(\omega_M)\theta_{def} \\ \quad :|\delta| \geq \theta_r \text{ or } |\theta_{Hys}| \geq \theta_{def} \end{cases} \quad (1)$$

$$g(\xi) = \begin{cases} \dfrac{1}{2-n}(\xi^{n-1} - (n-1)\xi) : n \neq 2 \\ \xi(1 - \ln\xi) : n = 2 \end{cases} \quad (2)$$

$$\delta = |\theta_M - \delta_0|, \; \xi = \delta/\theta_r \quad (3)$$

where $\theta r$: Width of unsteady region n: Constant representing the hysteresis bulge $\delta$: Rotational distance after reversal of rotational direction $\theta'_{Hys}$: Non-linear elastic deformation component $\theta_{Hys}(\delta)$ during reversal of rotational direction $\theta_{def}$: Direction-dependent deformation angle (offset component)

$\delta_0$: Motor-shaft angle $\theta_M$ during reversal of rotational direction;

determining a non-linear elastic deformation component $\theta_{Hys}$ during reversal of a motor-shaft rotational direction using the motor-shaft angle $\theta_M$ and the non-linear model; and adding a compensation input $N\theta_{Hys}$ (N: reduction ratio of the wave gear drive) to a motor-shaft angle command $\theta^*_M$ as feed-forward compensation, whereby the non-linear elastic deformation component included in the angular transmission error of an output shaft of the actuator is compensated for.

The method for compensating for angular transmission error of an actuator of the present invention further comprises causing the motor to rotate in a clockwise direction and in a counter-clockwise direction; measuring a motor-shaft synchronized component (fixed component), the motor-shaft synchronized component (fixed component) being an angular transmission error component in each of the motor-shaft angles $\theta_M$ occurring in synchronization with rotation of a motor shaft; calculating an average value $\theta_{TEMotor}$ of a measured value of clockwise rotation and counter-clockwise rotation of the motor; and adding a compensation input $N\theta^*_{TE}$ to the motor-shaft angle command $\theta^*_M$ as feed-forward compensation, the compensation input $N\theta^*_{TE}$ including the compensation value $\theta_{Hys}$ of the non-linear elastic deformation component and the compensation value $\theta_{TEMotor}$ of the motor-shaft synchronized component (fixed component), whereby the non-linear elastic deformation component and the motor-shaft synchronized component (fixed component) included in the angular transmission error of the output shaft of the actuator are compensated for.

According to the method for compensating for angular transmission error of the present invention, a model of a non-linear elastic deformation component is used to compensate for angular transmission error that is pronounced when the direction of positioning changes due to the occurrence of overshoot or the like, whereby positioning precision can be improved relative to the prior art, even when overshoot occurs.

DESCRIPTION OF THE PREFERRED EMBODIMENTS

The method for compensating for angular transmission error of an actuator provided with a wave gear drive according to the present invention will be described in detail below.

(Non-Linear Elastic Deformation Component of Angular Transmission Error)

Figure 1:
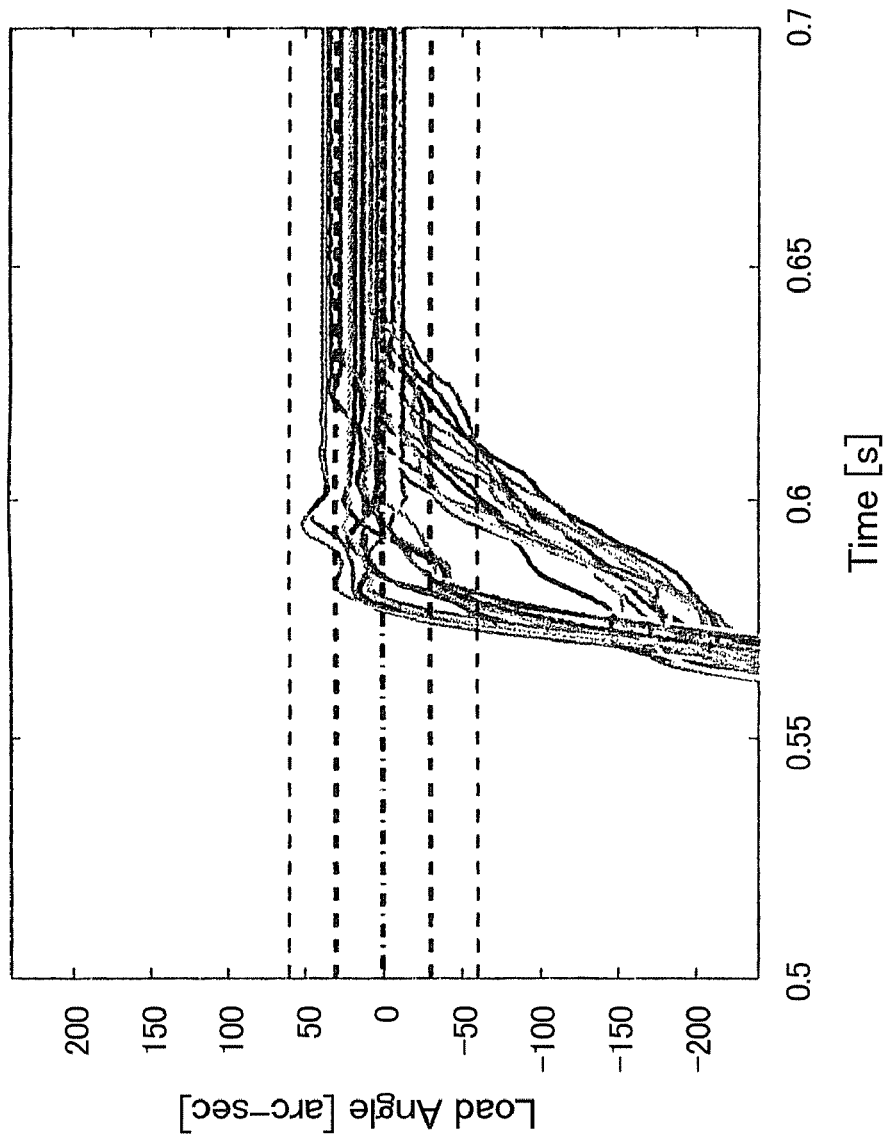
FIG. 1 is a graph showing the dispersion of the angular transmission error of an actuator when no overshoot occurs.
Figure 2:
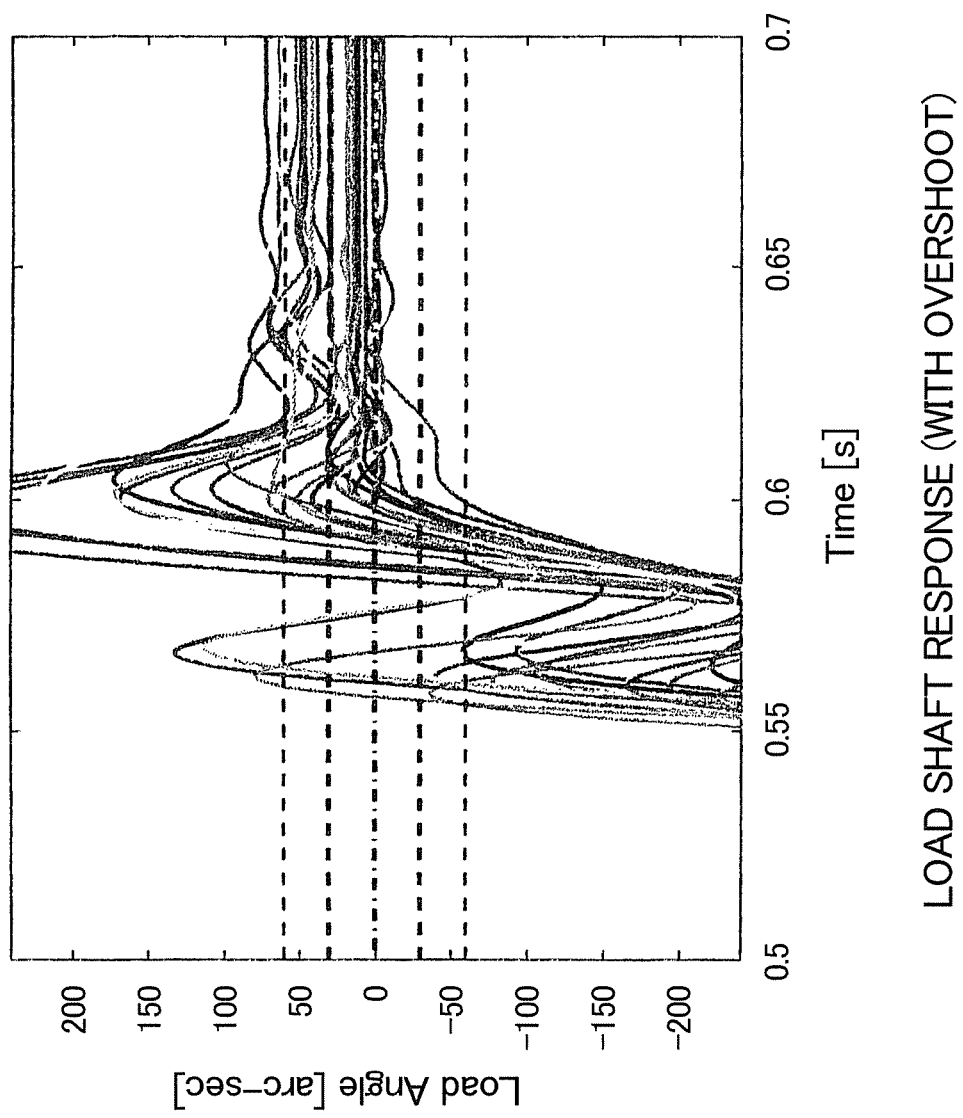
FIG. 2 is a graph showing the dispersion of the angular transmission error of an actuator when overshoot occurs.

When overshoot occurs in the positioning response of an actuator provided with a wave gear drive, the direction of rotation of the motor changes, and significant angular transmission error occurs due to the effects of the non-linear elastic deformation component resulting from elastic deformation of a flexible externally-toothed gear. FIGS. 1 and 2 show the dispersion in angular transmission error arising in the presence or absence of overshoot. Dispersion increases approximately 170% due to overshoot.

(Model of the Non-Linear Elastic Deformation Component)

Figure 3:
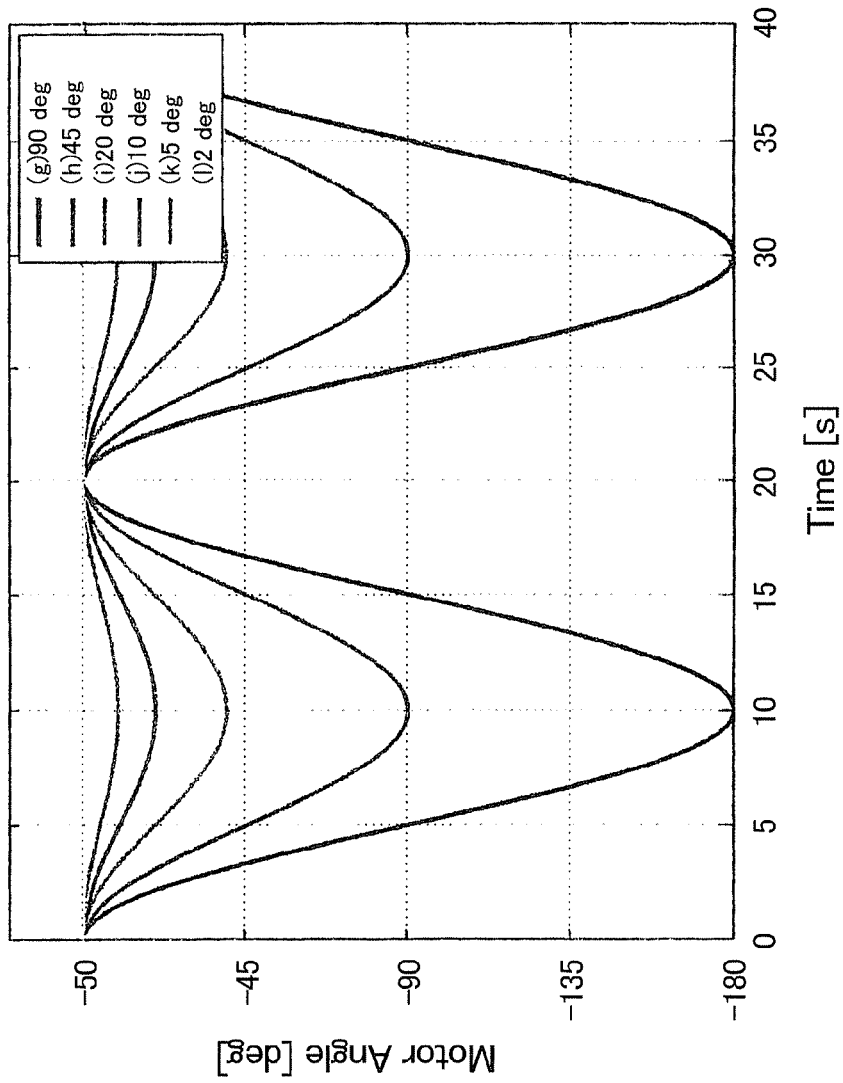
FIG. 3 is a graph showing the response characteristics of the motor shaft when the motor of the actuator is driven in a sine-wave shape.
Figure 4:
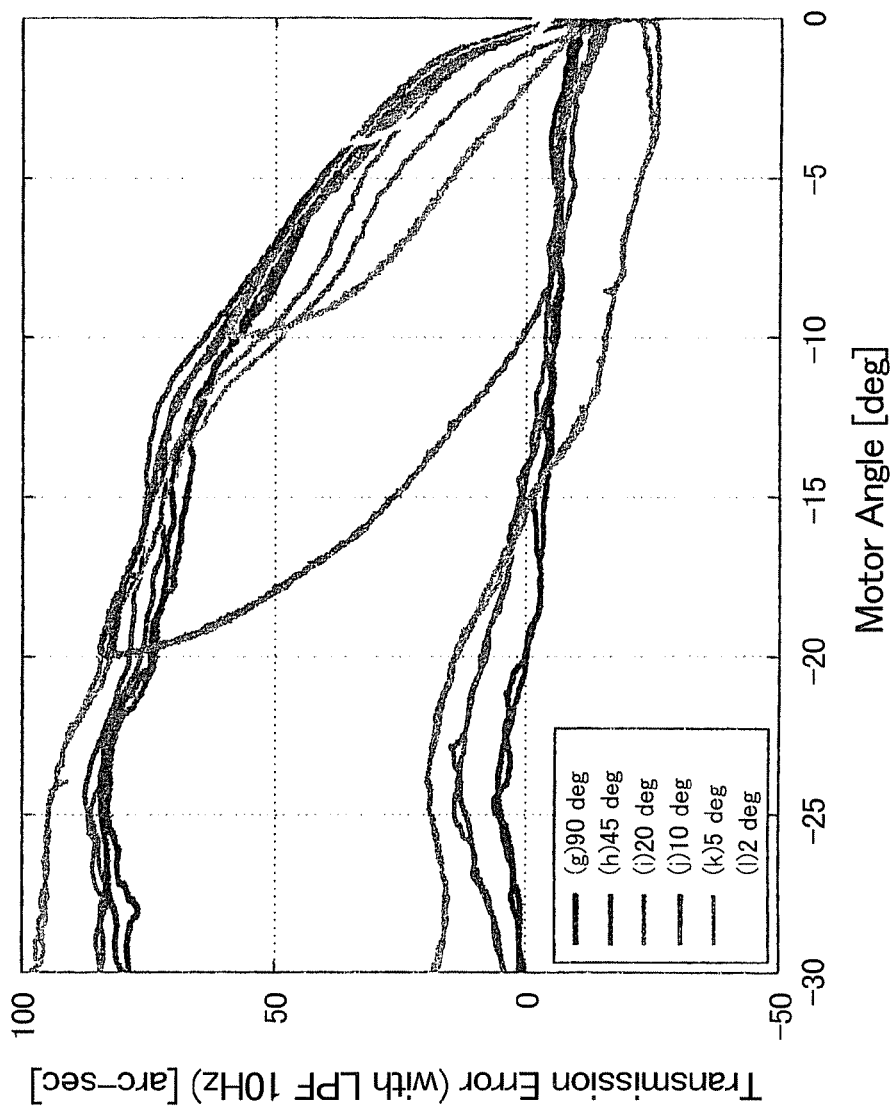
FIG. 4 is a graph showing the characteristics of the non-linear elastic deformation component when the motor of the actuator is driven in a sine-wave shape.

The non-linear elastic deformation component is a component of the angular transmission error occurring due to elastic deformation of the flexible externally-toothed gear when the direction of rotation of the motor changes. The motor can therefore be driven in a sine-wave shape and the non-linear elastic deformation component analyzed as shown in FIG. 3. The characteristics of the non-linear elastic deformation component are shown in FIG. 4, where the motor-shaft angle is on the horizontal axis, and the angular transmission error is on the longitudinal axis. FIG. 4 confirms that the characteristics of the non-linear elastic deformation component depend on the motor-shaft angle.

Figure 5:
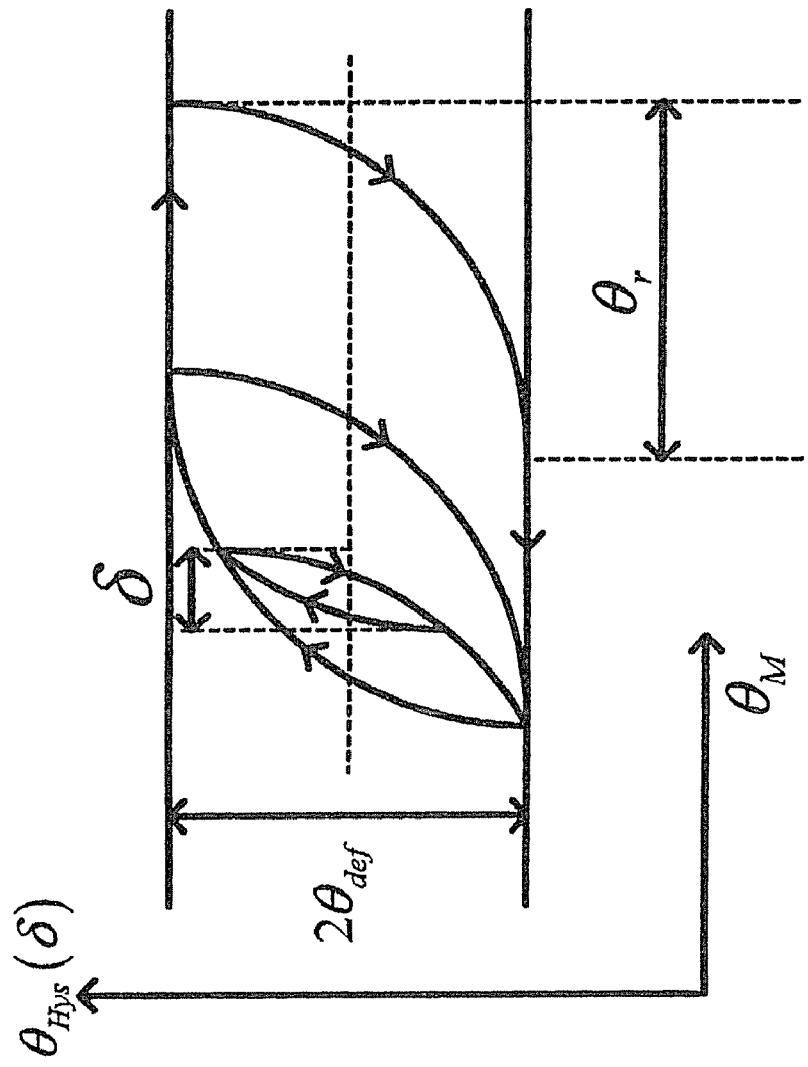
FIG. 5 is a graph showing a model of the non-linear elastic deformation component.

Accordingly, the characteristics of the non-linear elastic deformation component are expressed by a non-linear model created on the assumption of non-linear angular transmission error characteristics created by elastic deformation in the flexible externally-toothed gear in an area of microscopic displacements/velocities or during velocity reversals. As shown in FIG. 5, the dynamic characteristics of the non-linear elastic deformation component are defined as follows:

(a) the angular transmission error changes depending on a motor-shaft angle $\theta_M$ and a motor velocity $\omega_M$;

(b) an unsteady region $\theta r$, in which the angular transmission error changes non-linearly, occurs when the direction of rotation of the motor reverses; and (c) hysteresis also occurs during operation within the unsteady region. These characteristics are expressed by the mathematical models in equations 1 through 3.

(Equation 1)
$$\theta_{Hys}(\delta) = \begin{cases} \operatorname{sgn}(\omega_M)(2\theta_{def} g(\xi) - \theta'_{Hys}) \\ :|\delta| < \theta_r \text{ and } |\theta_{Hys}| < \theta_{def} \\ \operatorname{sgn}(\omega_M)\theta_{def} \\ :|\delta| \geq \theta_r \text{ or } |\theta_{Hys}| \geq \theta_{def} \end{cases} \quad (1)$$

(Equation 2)
$$g(\xi) = \begin{cases} \dfrac{1}{2-n}(\xi^{n-1} - (n-1)\xi) : n \neq 2 \\ \xi(1 - \ln\xi) : n = 2 \end{cases} \quad (2)$$

(Equation 3)
$$\delta = |\theta_M - \delta_0|, \xi = \delta/\theta_r \quad (3)$$

where $\theta r$: Width of unsteady region n: Constant representing the hysteresis bulge δ: Rotational distance after reversal of rotational direction $\theta'_{Hys}$: Non-linear elastic deformation component $\theta_{Hys}(\delta)$ during reversal of rotational direction $\theta_{def}$: Direction-dependent deformation angle (offset component)

$\delta_0$: Motor position $\theta_M$ during reversal of rotational direction

Figure 6:
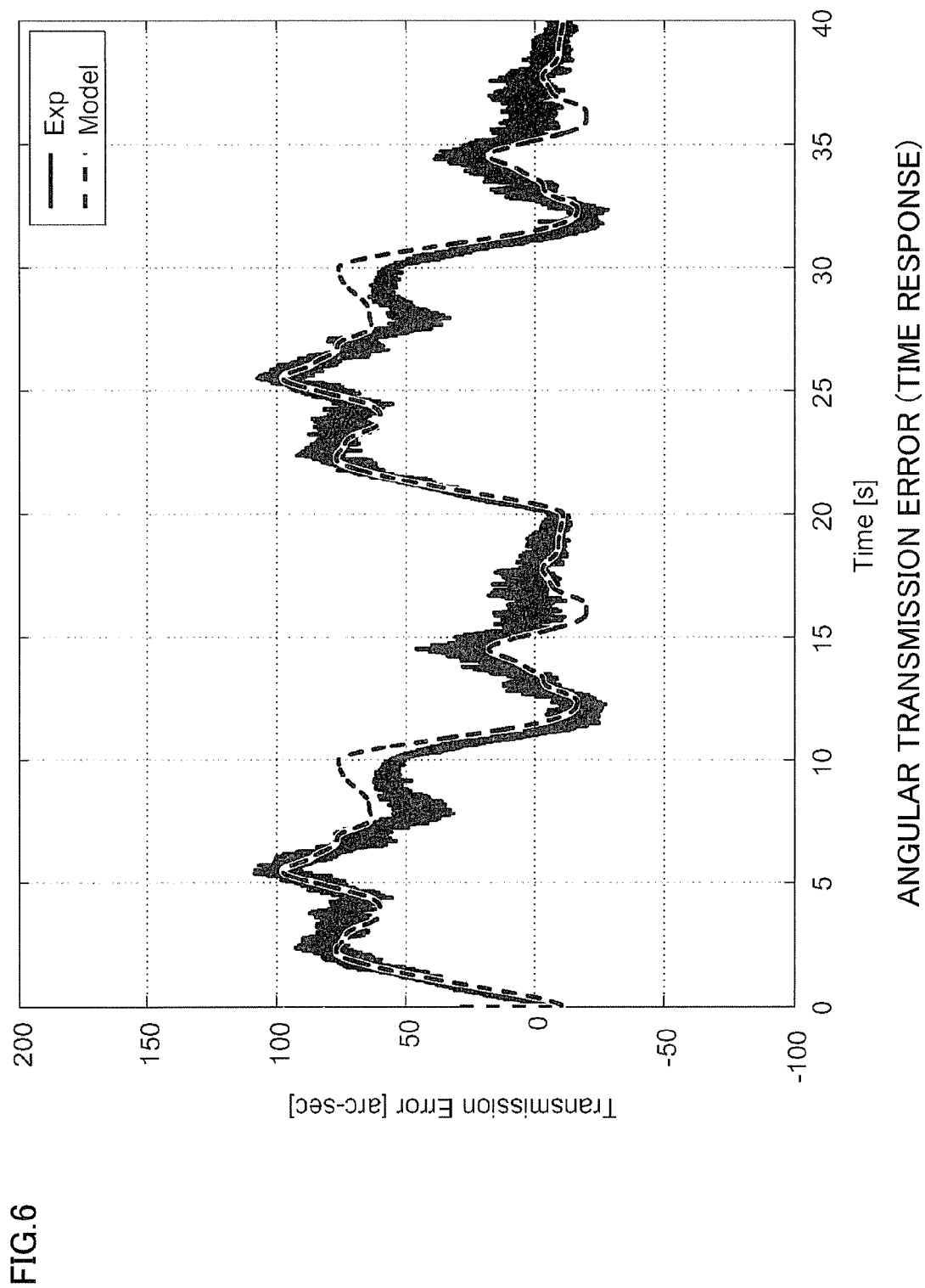
FIG. 6 is a graph showing the time-response characteristics of the angular transmission error when the motor shaft is driven in a sine wave having an amplitude of ±90°.
Figure 7:
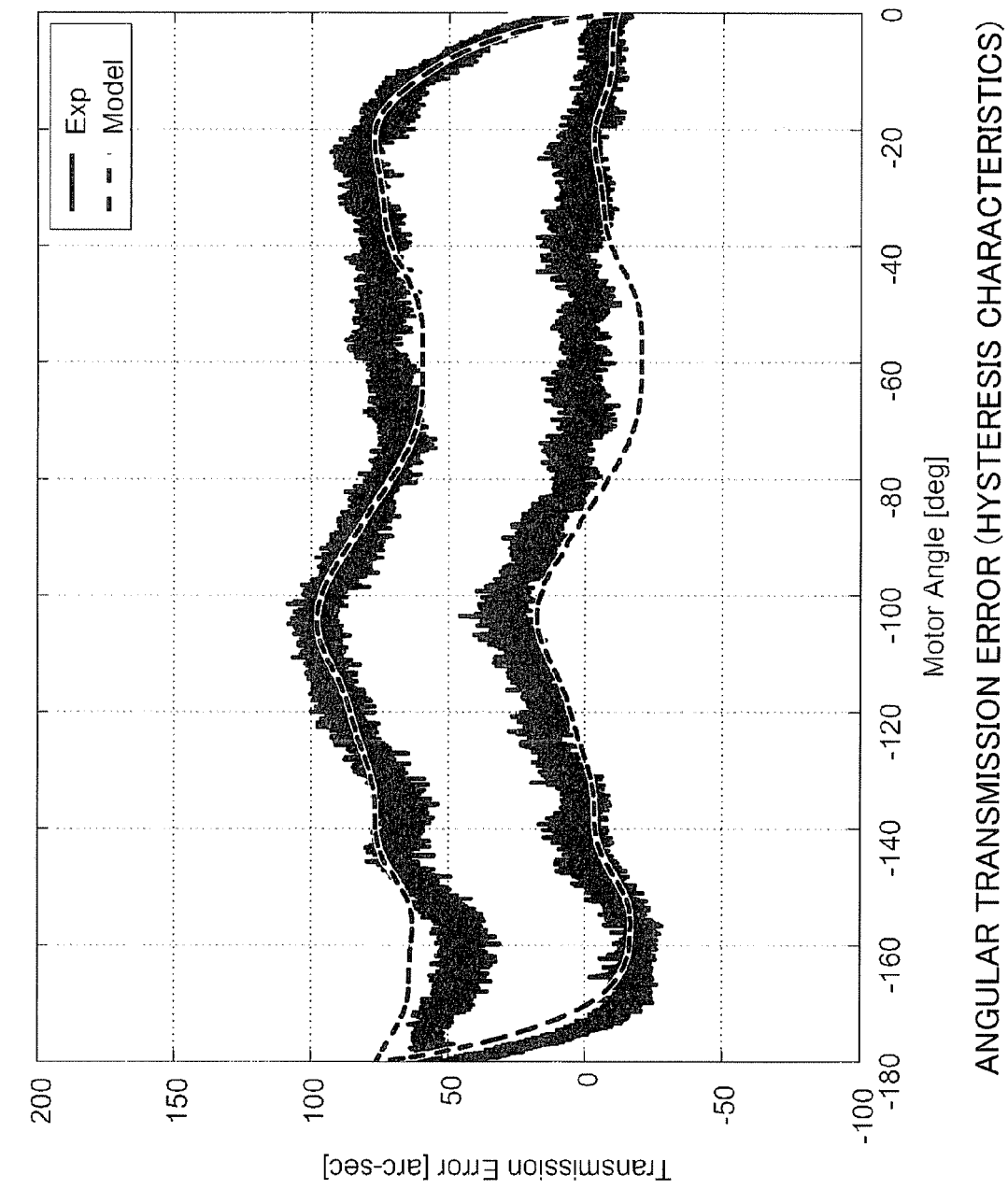
FIG. 7 is a graph showing the non-linear elastic deformation characteristics of the angular transmission error when the motor shaft is driven in a sine wave having an amplitude of ±90°.

In order to determine the validity of the present model, various parameters were set so as to simulate the characteristics of the non-linear elastic deformation component of an actual device, and comparisons were made. FIGS. 6 and 7 show the non-linear elastic deformation characteristics and time response of angular transmission error while driving the motor shaft using a sine wave having an amplitude of ±90°. In FIGS. 6 and 7, the unbroken line is the waveform of an actual device, and the broken line is the waveform of the simulation.

FIGS. 6 and 7 confirm that the established hysteresis-component model can properly reproduce the angular transmission error of an actual device (an actuator provided with a wave gear drive). Reproduction in the simulation is performed using a model of a motor-shaft synchronized component (fixed component) of the angular transmission error in addition to the non-linear elastic deformation component.

(Method for Compensating for the Non-Linear Elastic Deformation Component)

Figure 8:
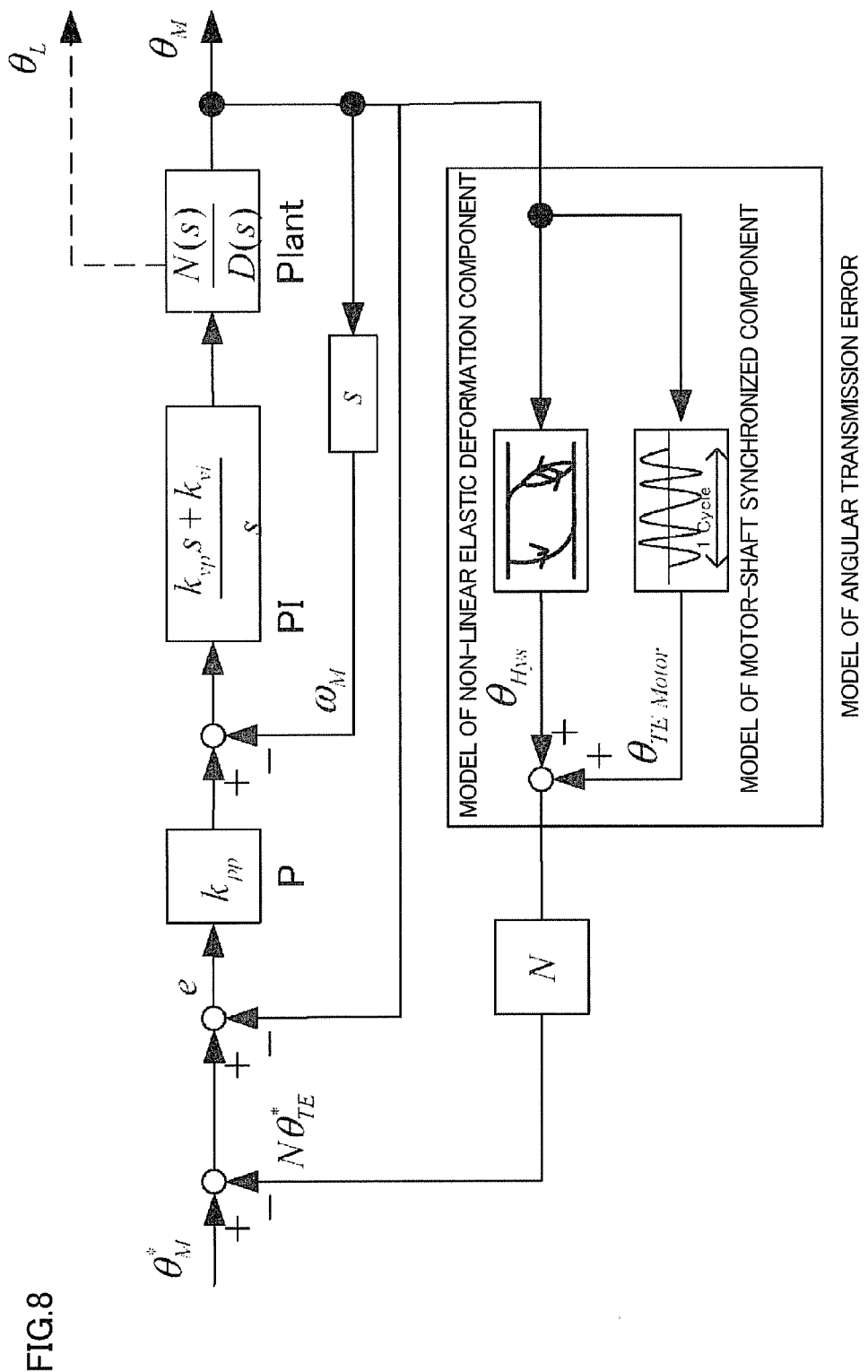
FIG. 8 is a block diagram that shows a control system for compensating for angular transmission error of an actuator.

Compensation for the non-linear elastic deformation component in the present invention is performed using the model of the non-linear elastic deformation component formulated as above. Compensation for the non-linear elastic deformation component is performed by adding a compensation input to a motor-shaft angle command as feed-forward compensation in the same manner as the method for compensating for the motor-shaft synchronized component (fixed component), as in the control system shown in FIG. 8.

The concept of angular transmission error compensation will now be clarified using mathematical equations. An angular transmission error $\theta_{TE}$ is defined as in equation (4) using a load-shaft angle $\theta_L$, the motor-shaft angle $\theta_M$, and a reduction ratio N. A compensation input $N\theta^*_{TE}$ for the angular transmission error is added to a motor-shaft angle command $\theta^*_M$ in the method of the present invention, and therefore a positional deviation e input to a P-PI control device is represented by equation (5).

$$\theta_{TE} = \theta_L - \theta_M/N \quad (4)$$

$$e = \theta^*_M - N\theta^*_{TE} - \theta_M \quad (5)$$

Substituting equation (4) into equation (5) yields:

$$\theta_{TE} - \theta^*_{TE} = \theta_L - (\theta^*_M - e)/N \quad (6)$$

Equation (7) is in effect when an estimated value $\theta^*_{TE}$ of the angular transmission error adequately represents the angular transmission error of the actual device, when $\theta_{TE} = \theta^*_{TE}$, when the motor is made to respond freely, and when e=0.

$$\theta^*_M/N = \theta_L \quad (7)$$

In other words, the actual measured load-shaft angle and the load-shaft angle calculated from the motor-shaft angle command are in agreement. However, the condition of e=0 must be met in order for this motor-shaft angle to be in agreement with the command value, and, in reality, compensation can only be performed during completion of positioning when e=0 and when the motor is still.

EXAMPLES

Experimental Method

Figure 9:
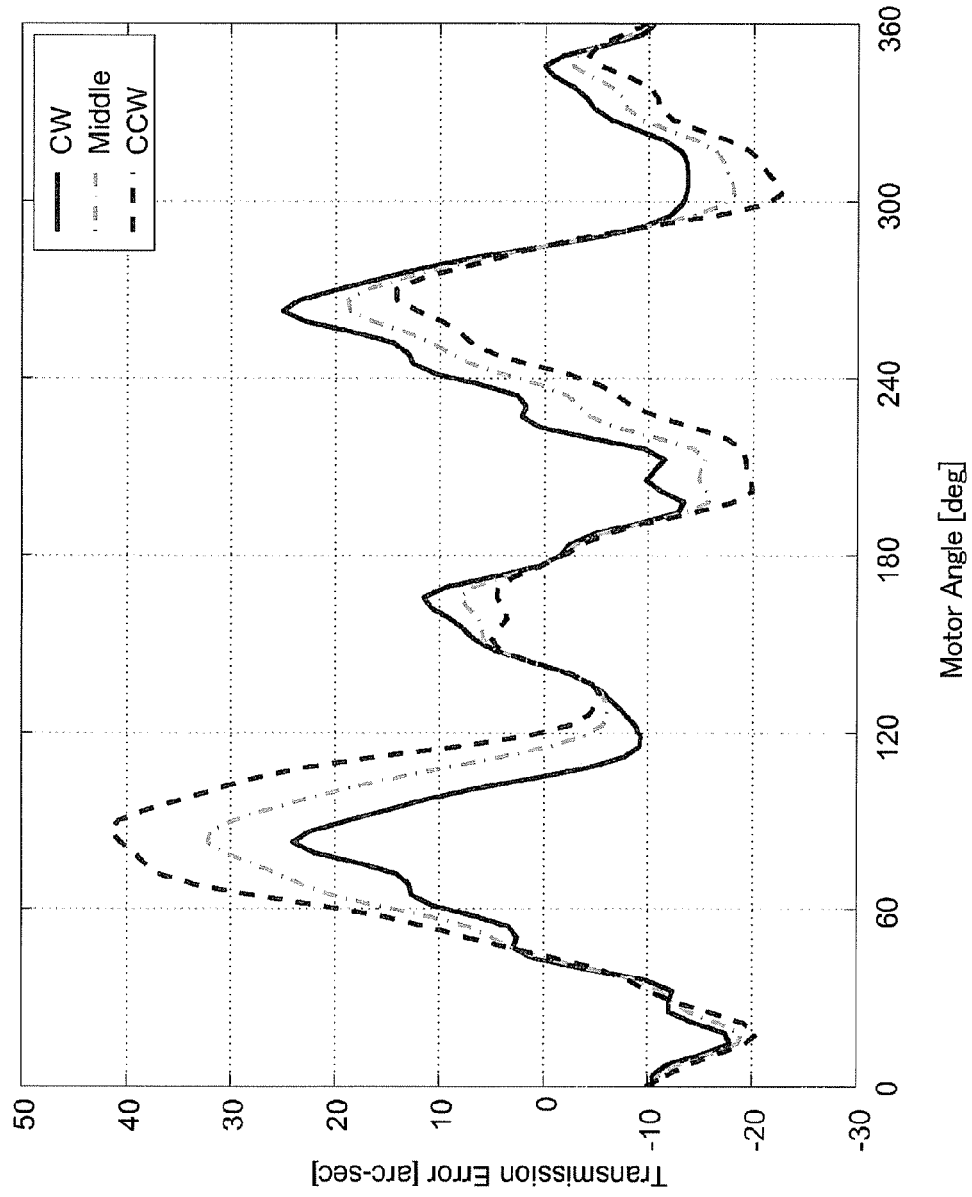
FIG. 9 is a graph showing the motor-shaft synchronized component (fixed component) included in the angular transmission error of the actuator.

Compensation for the non-linear elastic deformation component was performed in order to reduce the dispersion in the angle of the load shaft (the actuator output shaft) when overshoot occurs during the indexing operation of a dividing plate or the like. Tables 2, 3, and 4 show, respectively, the experimental conditions, the conditions for compensating for angular transmission error, and the parameters for the model of the non-linear elastic deformation component. The Mid model (the alternatingly-dotted line in FIG. 9) was used for compensation of the motor-shaft synchronized component (fixed component). The model Mid comprises the average values of the counterclockwise model and the clockwise model of the motor-shaft synchronized component (fixed component)

measured when causing the motor to rotate in the clockwise direction and in the counterclockwise direction.

TABLE 2

| Experimental conditions | |
|---|---|
| Control system | P-PI control system + bang-bang control |
| Operation pattern | Indexing operation |
| Feed angle | Load-shaft angle 43.56 deg (6.05 motor revolutions) |
| Feed direction | Positive direction (CW) |
| Number of positionings | 240 |
| Interval | 2 s |
| Compensation for angular transmission error | Shown separately in Table 3 |

TABLE 3

| Conditions for compensating for angular transmission error |
|---|
| (a) No compensation |
| (b) Compensation for motor-shaft synchronized component (fixed component) (Mid) only |
| (c) Compensation for non-linear elastic deformation component only |
| (d) Compensation for motor-shaft synchronized component (fixed component) (Mid) + compensation for non-linear elastic deformation component |

TABLE 4

| Parameters for model of non-linear elastic deformation component | | |
|---|---|---|
| Width of unsteady region | $\theta_r$ (deg) | 7 |
| Hysteresis constant | n | 2.1 |
| Direction-dependent deformation angle | $\theta_{def}$ (arc-sec) | 30 |

Experimental Results

Figure 10:
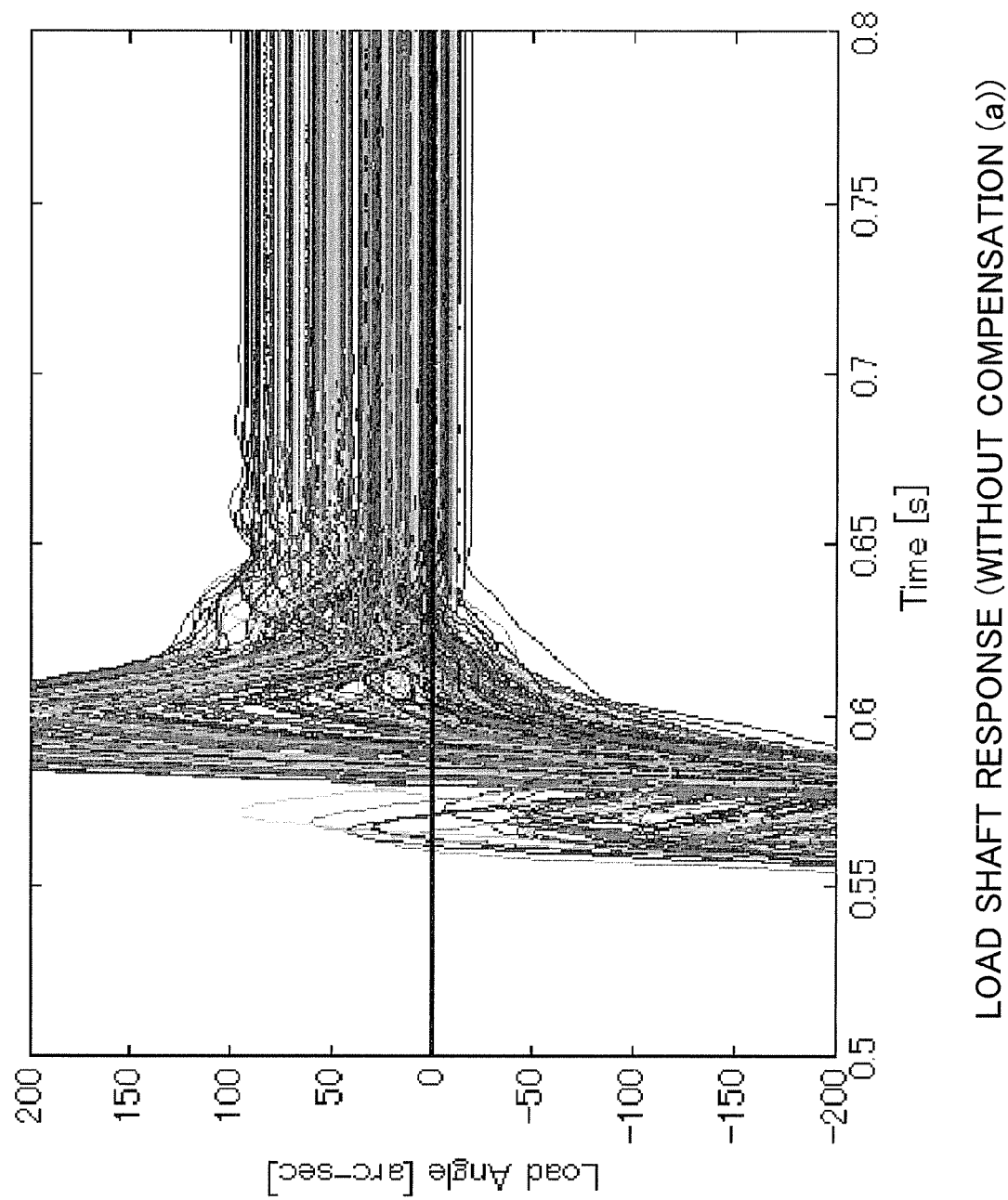
FIG. 10 is a graph showing the results when compensation for angular transmission error is not performed on 240 overshoot-producing indexing operations.
Figure 11:
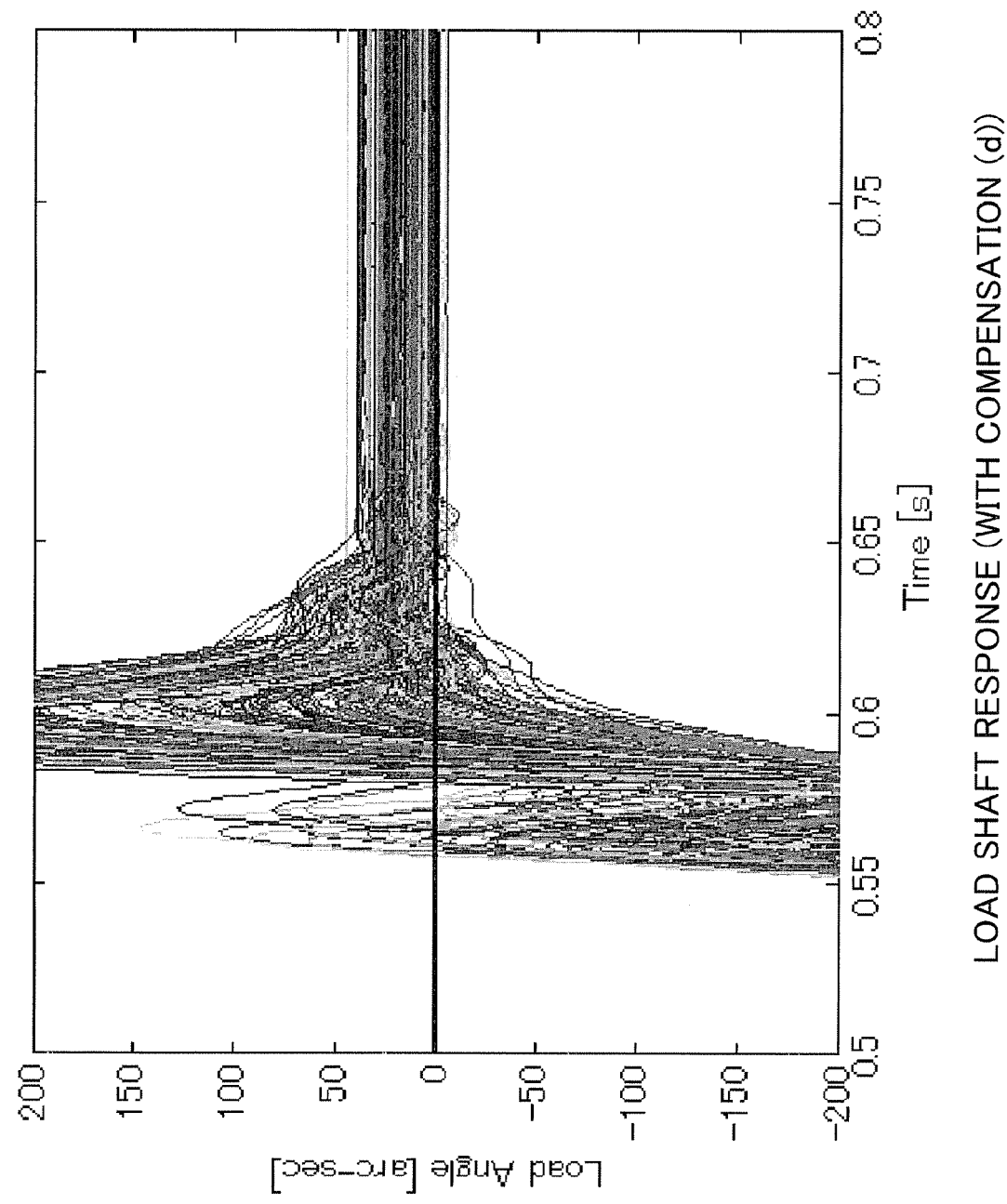
FIG. 11 is a graph showing the results when compensation for angular transmission error is performed using the model of the non-linear elastic deformation component on 240 overshoot-producing indexing operations.

FIGS. 10 and 11 show the results when compensating for angular transmission error using the model of the non-linear elastic deformation component on 240 overshoot-producing indexing operations. FIGS. 10 and 11 confirm that dispersion in the response of the load shaft can be greatly minimized by performing compensation for the non-linear elastic deformation component.

Table 5 quantitatively demonstrates the results of compensating for angular transmission error. Dispersion can be reduced to approximately 65% relative to no compensation ((a), FIG. 10) using conventional compensation Mid for the motor-shaft synchronized component (fixed component). In comparison, dispersion can be reduced to approximately 32% when compensation for the non-linear elastic deformation component is added (compensation for the motor-shaft synchronized component (fixed component) (Mid) and compensation for the non-linear elastic deformation component) ((d), FIG. 11).

TABLE 5

| | | Evaluated values (steady-state error, 3σ) | | | |
|---|---|---|---|---|---|
| | | (a) No Comp | (b) Motor (Mid) | (c) Hysteresis | (d) Motor (Mid) + Hysteresis |
| Average value | (arc-sec) | 26.5 | 25.9 | 17.7 | 18.8 |
| 3σ | (arc-sec) | 81.0 | 52.3 | 48.9 | 25.6 |

TABLE 5-continued

| | | Evaluated values (steady-state error, 3σ) | | | |
|---|---|---|---|---|---|
| | | (a) No Comp | (b) Motor (Mid) | (c) Hysteresis | (d) Motor (Mid) + Hysteresis |
| Average value | (%) | 100 | 98.0 | 66.8 | 70.8 |
| 3σ | (%) | 100 | 64.5 | 60.4 | 31.6 |

(Evaluation Indicators)

In the present experiment, the difference between the target angle and the actual measured angle of the load shaft during the 2 s of FIG. 11 during which positioning is completed and the load shaft stops was defined as "steady—state deviation" and was evaluated.

Average value of steady-state deviation: Evaluation indicator for steady-state deviation (offset) of positioning response.

Steady-state deviation 3σ: Evaluation indicator for the dispersion of the positioning response, three times the value of the standard deviation σ. The probability of a value occurring ±3σ or more away from the average when the dispersion conforms to a normal distribution is 0.3%. Therefore, ±3σ can be thought of as the range of possible dispersion values.

What is claimed is:

1. A method for compensating for angular transmission error of an actuator provided with a motor and a wave gear drive, comprising:

in a control system for positioning an output shaft of the actuator using a non-linear model composed of a mathematical model given by equations (1) through (3) to stipulate dynamic characteristics of a non-linear elastic deformation component included in the angular transmission error of the actuator and brought about by elastic deformation of a flexible externally-toothed gear of the wave gear drive:

$$\theta_{Hys}(\delta) = \begin{cases} \mathrm{sgn}(\omega_M)(2\theta_{def}g(\xi) - \theta'_{Hys}) \\ \quad : |\delta| < \theta_r \text{ and } |\theta_{Hys}| < \theta_{def} \\ \mathrm{sgn}(\omega_M)\theta_{def} \\ \quad : |\delta| \geq \theta_r \text{ or } |\theta_{Hys}| \geq \theta_{def} \end{cases} \quad (1)$$

$$g(\xi) = \begin{cases} \dfrac{1}{2-n}(\xi^{n-1} - (n-1)\xi) : n \neq 2 \\ \xi(1 - \ln\xi) : n = 2 \end{cases} \quad (2)$$

$$\delta = |\theta_M - \delta_0|, \xi = \delta/\theta_r \quad (3)$$

where θr: Width of unsteady region n: Constant representing the hysteresis bulge δ: Rotational distance after reversal of rotational direction $\theta'_{Hys}$: Non-linear elastic deformation component $\theta_{Hys}(\delta)$ during reversal of rotational direction $\theta_{def}$: Direction-dependent deformation angle (offset component)

$\delta_0$: Motor-shaft angle $\theta_M$ during reversal of rotational direction;

determining a non-linear elastic deformation component $\theta_{Hys}$ during reversal of a motor-shaft rotational direction using the motor-shaft angle $\theta_M$ and the non-linear model;

adding a compensation input $N\theta_{Hys}$ (N: reduction ratio of the wave gear drive) to a motor-shaft angle command $\theta^*_M$ as feed-forward compensation, to thereby obtain a compensated motor-shaft angle command; and using the compensated motor-shaft angle command to control driving of the motor;

whereby the non-linear elastic deformation component included in the angular transmission error of an output shaft of the actuator is compensated for.

2. A method for compensating for angular transmission error of an actuator provided with a motor and a wave gear drive, comprising:

using a non-linear model composed of a mathematical model given by equations (1) through (3) to stipulate dynamic characteristics of a non-linear elastic deformation component included in the angular transmission error of the actuator and brought about by elastic deformation of a flexible externally-toothed gear of the wave gear drive:

$$\theta_{Hys}(\delta) = \begin{cases} \text{sgn}(\omega_M)(2\theta_{def}\,g(\xi) - \theta'_{Hys}) \\ \quad :|\delta| < \theta_r \text{ and } |\theta_{Hys}| < \theta_{def} \\ \text{sgn}(\omega_M)\theta_{def} \\ \quad :|\delta| \geq \theta_r \text{ or } |\theta_{Hys}| \geq \theta_{def} \end{cases} \quad (1)$$

$$g(\xi) = \begin{cases} \dfrac{1}{2-n}(\xi^{n-1} - (n-1)\xi) : n \neq 2 \\ \xi(1 - \ln\xi) : n = 2 \end{cases} \quad (2)$$

$$\delta = |\theta_M - \delta_0|, \, \xi = \delta/\theta_r \quad (3)$$

where $\theta_r$: Width of unsteady region n: Constant representing the hysteresis bulge $\delta$: Rotational distance after reversal of rotational direction $\theta'_{Hys}$: Non-linear elastic deformation component $\theta_{Hys}(\delta)$ during reversal of rotational direction $\theta_{def}$: Direction-dependent deformation angle (offset component)

$\delta_0$: Motor-shaft angle $\theta_M$ during reversal of rotational direction;

determining a non-linear elastic deformation component $\theta_{Hys}$ during reversal of a motor-shaft rotational direction using the motor-shaft angle $\theta_M$ and the non-linear model;

adding a compensation input $N\theta_{Hys}$ (N: reduction ratio of the wave gear drive) to a motor-shaft angle command $\theta^*_M$ as feed-forward compensation;

whereby the non-linear elastic deformation component included in the angular transmission error of an output shaft of the actuator is compensated for;

causing the motor to rotate in a clockwise direction and in a counter-clockwise direction;

measuring a motor-shaft synchronized component (fixed component), the motor-shaft synchronized component (fixed component) being an angular transmission error component in each of the motor-shaft angles $\theta_M$ occurring in synchronization with rotation of a motor shaft;

calculating an average value $\theta_{TEMotor}$ of a measured value of clockwise rotation and counter-clockwise rotation of the motor; and adding a compensation input $N\theta^*_{TE}$ to the motor-shaft angle command $\theta^*_M$ as feed-forward compensation, the compensation input $N\theta^*_{TE}$ including the compensation value $\theta_{Hys}$ of the non-linear elastic deformation component and the compensation value $\theta_{TEMotor}$ of the motor-shaft synchronized component (fixed component), whereby the non-linear elastic deformation component and the motor-shaft synchronized component (fixed component) included in the angular transmission error of the output shaft of the actuator are compensated for.

* * * * *